United States Patent [19]

Quintel

[11] Patent Number: 4,679,383
[45] Date of Patent: Jul. 14, 1987

[54] LAWN EDGER

[75] Inventor: Francis W. Quintel, Allenby Gardens, Australia

[73] Assignee: Robert Douglas Sheehan, South Australia, Australia

[21] Appl. No.: 797,679

[22] PCT Filed: Feb. 22, 1985

[86] PCT No.: PCT/AU85/00031
§ 371 Date: Oct. 21, 1985
§ 102(e) Date: Oct. 21, 1985

[87] PCT Pub. No.: WO85/03620
PCT Pub. Date: Aug. 29, 1985

[30] Foreign Application Priority Data

Feb. 24, 1984 [AU] Australia .............................. PG3784

[51] Int. Cl.4 ............................................ A01D 34/84
[52] U.S. Cl. ..................................... 56/13.4; 56/255;
56/17.4; 56/17.2
[58] Field of Search ............................ 172/15, 16, 111;
56/13.4, 13.1, 13.2, 255, 17.4, 16.9, 16.7

[56] References Cited

U.S. PATENT DOCUMENTS

| 2,578,880 | 12/1951 | Doyle | 56/255 X |
|---|---|---|---|
| 2,790,294 | 4/1957 | Marich | 56/294 |
| 2,811,004 | 10/1957 | Borrow | 56/24 |
| 2,860,475 | 11/1958 | Richard | 56/26 |
| 2,909,021 | 10/1959 | McLane | 56/255 |
| 2,953,888 | 9/1960 | Phillips | 56/255 X |
| 3,031,836 | 5/1962 | Witt | 56/501 |
| 3,112,594 | 12/1963 | Hallenbeck | 56/16.9 |
| 3,141,283 | 7/1964 | Swindler | 56/17.2 |
| 3,221,481 | 12/1965 | Mattsom | 56/16.9 |
| 3,530,653 | 9/1970 | Ott | 56/25.4 |
| 3,623,305 | 11/1971 | Freedlander | 56/295 |
| 3,807,150 | 4/1974 | Rosenthal | 56/320.1 |
| 3,871,052 | 3/1975 | Luckcuck | 56/13.1 |
| 3,918,119 | 11/1975 | Sweet | 56/13.4 |
| 3,935,695 | 2/1976 | Merry | 56/13.4 |
| 4,121,406 | 10/1978 | Quintel | 56/13.4 |
| 4,263,771 | 4/1981 | Iaboni | 56/16.9 |
| 4,455,813 | 6/1984 | Hira | 56/255 |
| 4,488,395 | 12/1984 | Mack | 56/13.4 |

FOREIGN PATENT DOCUMENTS

| 532828 | 9/1939 | United Kingdom . |
| 1153426 | 8/1966 | United Kingdom . |
| 1095507 | 9/1966 | United Kingdom . |
| 1261549 | 1/1968 | United Kingdom . |
| 1380439 | 6/1972 | United Kingdom . |

Primary Examiner—Richard J. Johnson
Attorney, Agent, or Firm—Baker, Maxham & Jester

[57] ABSTRACT

A lawn edger having a motor (14) arranged with a vertical axis of rotation, a fan and cutter assembly (15) within a hollow frame (11), cutting blades (17) being below the fan blades (16) and extending not only radially outwardly from the axis of rotation but also axially downwardly so that they slope towards the cutting edges, and cutting is affected over a small segment of the periphery of the cutting blades, for example, by tilting the lawn edger to one side.

10 Claims, 6 Drawing Figures

LAWN EDGER

This invention relates to a power operated machine which is useful for cutting grass, for example for edging an area of lawn.

BACKGROUND OF THE INVENTION

Power operated lawn edgers have been proposed heretofore, and in some instances they rely upon blades which rotate about a horizontal axis which is transverse to the direction of movement of the implement. This arrangement works particularly well but requires considerable power input, and the object of this invention is to provide a much simpler device which requires less power input, but is nevertheless effective both in the cutting of grass and the disposing of it.

One of the problems which is encountered with lawn-mowers and lawn-edging machines is the tendency for impact of grass, stones, grit and the like to cause blunting of the cutter blades, and one object of this invention is to provide improvements whereby this effect is less than with some prior art machines. Another problem which is encountered is that if the blades are driven about a horizontal axis, for example, they can encounter unyielding substrates and cause considerable damage, and another object of the invention is to provide improvements whereby the likelihood of such damage is substantially reduced.

BRIEF SUMMARY OF THE INVENTION

Briefly, in this invention a lawn edger has a motor arranged with a vertical axis of rotation, a fan and cutter assembly within a hollow frame, the cutter blades being below the fan blades and extending not only radially outwardly from the axis of rotation but also axially downwardly so that they slope towards the cutting edges, and cutting is effected over a small segment of the periphery of the cutting blades, for example, by tilting the lawn edger to one side.

More specifically, the invention consists of a lawn edger comprising a hollow frame, ground engaging wheels supporting the frame, a motor carried by the frame having a rotor with a vertical axis of rotation, a fan and cutter assembly within the hollow frame, said fan and cutter assembly comprising a plurality of fan blades which extend outwardly from the axis of rotation, and a plurality of cutting blades beneath the fan blades and which extend axially downwardly and radially outwardly from the axis of rotation, and means coupling the rotor to the fan and cutter assembly for driving the latter.

Since cutting is effected over a small segment, there is a gradual lead into and out of the cutting zone by the blades as they traverse their path of travel and this does much towards limiting the damage to blades due to encountering unyielding obstructions. Furthermore, the under surfaces of the blades will abrade against the substrate with which they co-operate and this provides a "self-sharpening" action.

Notwithstanding the above however it is still possible for damage to occur and in an embodiment of the invention this damage is further reduced by having the blades sufficiently flexible and resilient that they are deflectable upwardly against the underside of respective fan blades, or hinged and springloaded downwardly. The cutter blades can for example be of spring steel strip or can be of a moulded polymeric material such as polyurethane.

Heretofore lawn edgers have usually been constructed to be supported by at least three wheels, but is is desirable with this invention that an edger can be tilted in any direction, and in one embodiment of the invention there is a ground wheel located on the axis of rotation, and a pair of half wheels on a transverse axle rearwardly thereof, the half wheels being movable together to constitute a single wheel, or being separable to constitute two transversely spaced wheels. When the half wheels are together the edger can be tilted transversely as well as in a fore and aft direction, and when they are separated the machine can be stably supported by three ground engaging surfaces.

A DETAILED DESCRIPTION OF THE PREFERRED EMBODIMENT

An embodiment of the invention is described hereunder with reference to and is illustrated in the accompanying drawings in which FIG. 1 is a side elevation of a lawn edger, FIG. 2 is a plan view taken on line 2—2 of FIG. 1, FIG. 3 is a section taken on line 3—3 of FIG. 1, but drawn to an enlarged scale, FIG. 4 is an underside view of FIG. 3, FIG. 5 is an "exploded" view showing the fan and cutter of a fan and cutter assembly as illustrated in FIGS. 1 through to 4, and FIG. 6 is a view similar to FIG. 5 but showing a cutter blade of spring steel strip instead of the polymeric cutter blades of FIG. 5, FIG. 6 being drawn to a larger scale.

DESCRIPTION OF THE EMBODIMENT

Figure 1:
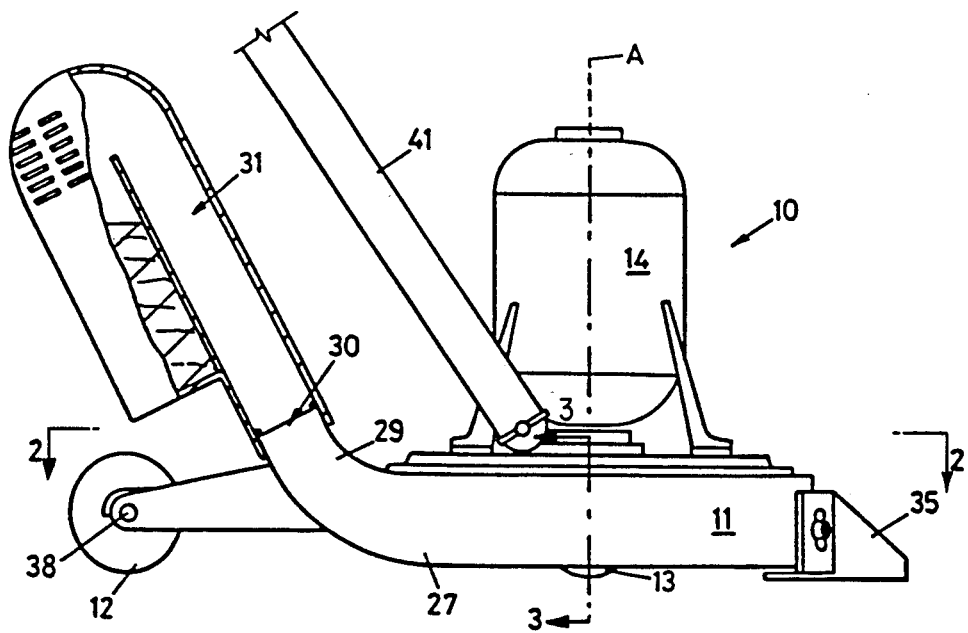

In this embodiment, a lawn edger 10 comprises a hollow frame 11 which is supported by ground engaging wheels 12 and 13.

A motor 14 (in this embodiment depicted as an electric motor but an engine can be used in lieu thereof) is carried on the hollow frame 11, and is coupled by appropriate coupling means to a fan and cutter assembly 15. The coupling means in this embodiment would typically comprise a dish-like member which is arranged to be frictionally engaged by the throw out members of a centrifugal clutch (not separately shown), this being particularly convenient because the motor 14 can then be withdrawn from the hollow frame 11 with a minimum of disassembly.

Figure 6:
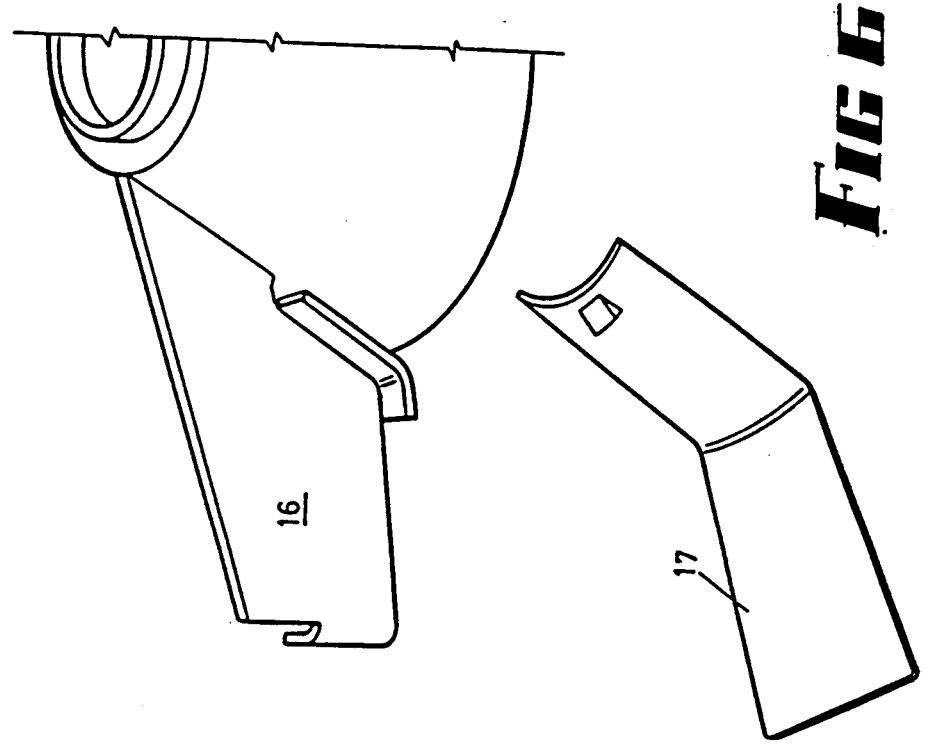
Figure 5:
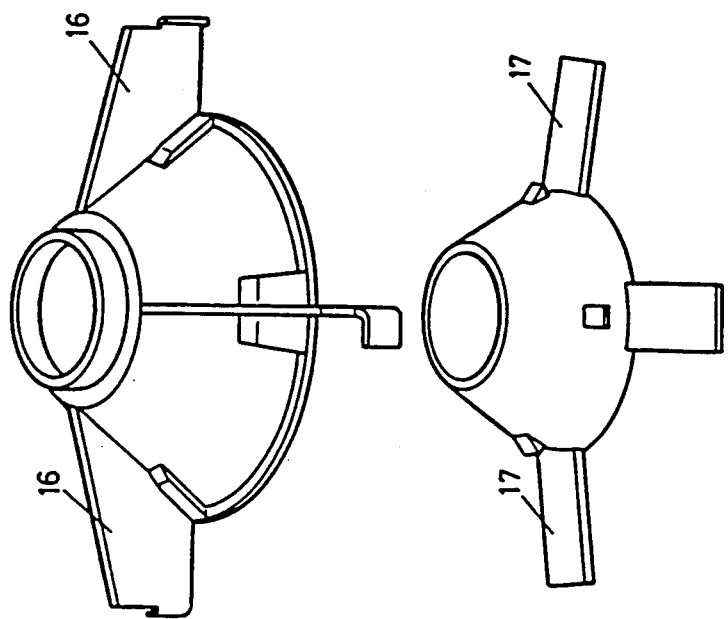

As best seen in FIGS. 5 and 6, the fan and cutter assembly comprises fan blades 16 and cutting blades 17. In FIG. 5 the cutting blade 17 forms part of a unitary moulding of high durometer polyurethane elastomer, while in FIG. 6 the cutting blades 17 are formed from strip spring steel. In both instances however the cutting blades are sufficiently flexible and resilient to be deflectable upwardly against a respective fan blade 16. In the described embodiment, each cutting blade 17 is located directly below a respective fan blade 16. It will be noted that the cutting blades 17 extend axially downwardly as well as radially outwardly from the axis of rotation designated 'A'.

Figure 2:
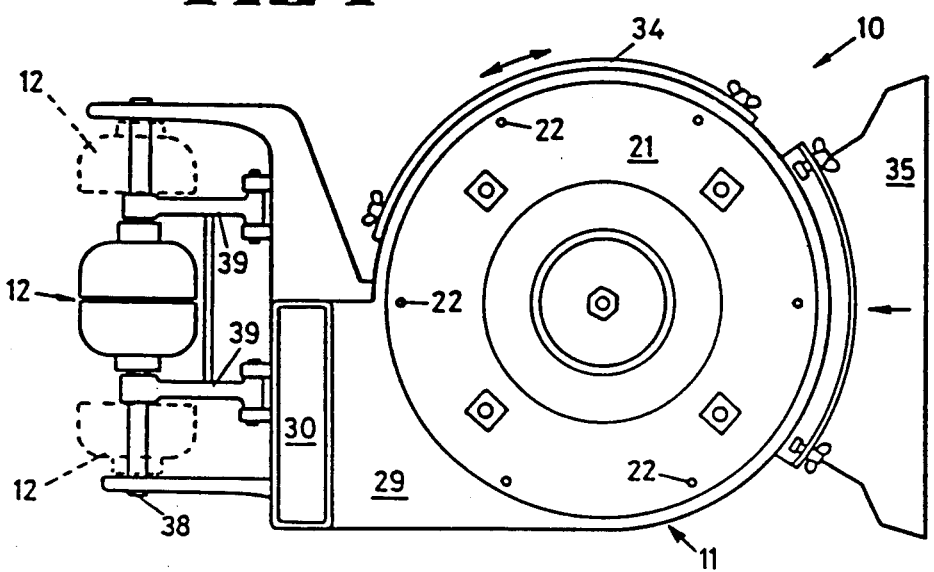

The hollow frame 11 is mostly circular, but is generally also of volute shape as can be seen best in FIG. 2, and comprises an upper wall 21 which is located over spigots 22 and retained to the main part of the frame 23 by fasteners (not shown), above an opening designated 24 of sufficient diameter that the fan and cutter assembly 15 can be lifted from the main part of the frame 23 for maintenance purposes, for example for replacement of cutting blades 17. (See FIG. 3).

Figure 3:
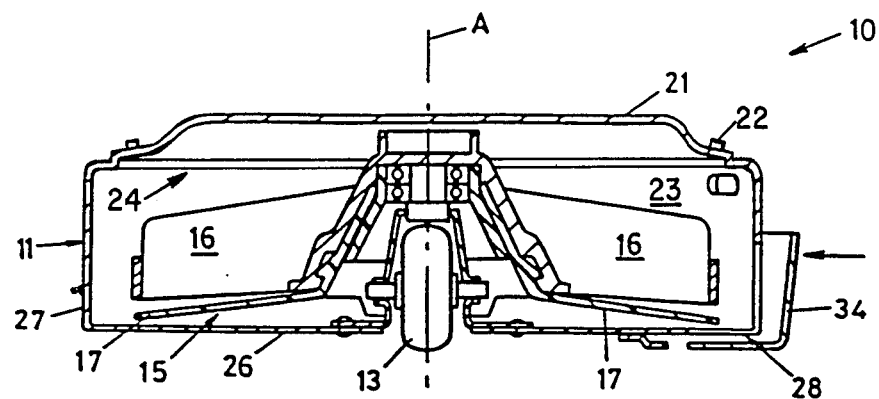
Figure 4:
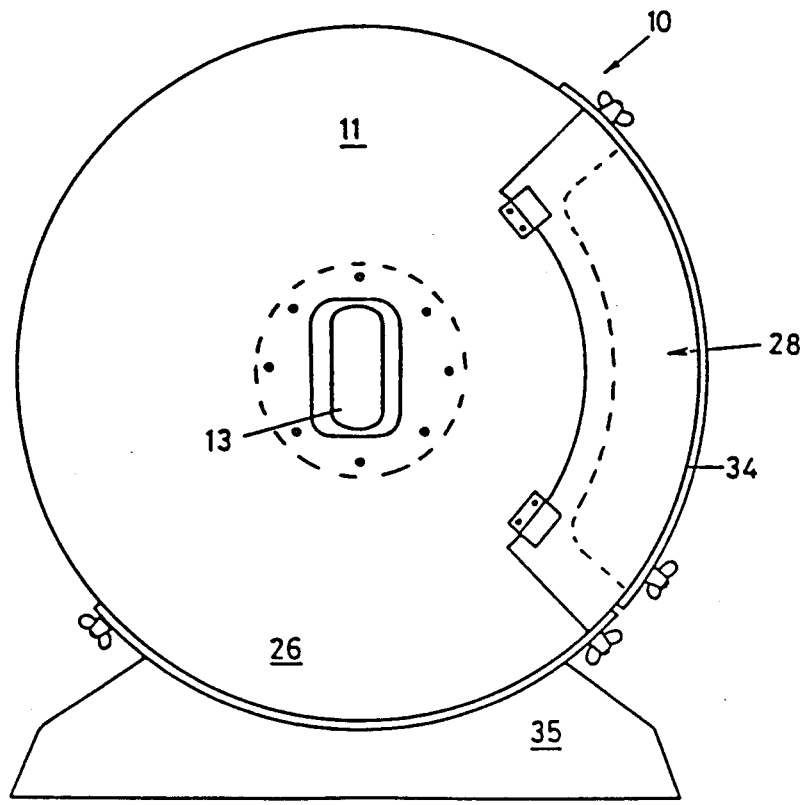

Also as shown best in FIG. 3, the hollow frame 11 comprises a lower wall 26 which is generally discoid in shape, and this is fixed with respect to the main portion of the frame 23, but the lower wall 26 and the side wall 27 are each discontinuously about their respective peripheries to provide an inlet opening 28 which extends only part way around the periphery of the hollow frame 11, the hollow frame 11 also having walls 29 defining an outlet opening 30. As seen best in FIGS. 1 and 2, the outlet opening 30 has secured to it a refuse container 31 which may be a "hard wall" container as illustrated or may be a pervious bag.

There is provided a shutter 34 which may be secured over the inlet opening 28, and also a suction hood 35, the opening in the side wall 27 of the hollow frame 11 extending sufficiently that the shutter 34 and the suction hood 35 will close that opening, but alternatively, the shutter 34 can be moved around to replace the closure otherwise effected by the suction hood 35 leaving an opening in the side wall laterally of the path of travel of the lawn edger 10. Thus the lawn edger 10 can be effective in edging a lawn laterally of the axis of rotation 'A', or it can be used for suction pickup of particulate material. It may be noted that although the hollow frame 11 is of partly volute shape, the air flow does not follow the normal path of air flow in the usual type of centrifugal fan, but rather the flow is induced by the periphery of the fan and cutter assembly 15, which, in this rotation, entrains air either from the suction hood 35 or through the opening 28, and causes that air to pass outwardly through the outlet opening 30.

As explained previously, it is desirable that the edger should be capable of being tilted either transversely or longitudinally. In order to achieve a longitudinal tilt, the ground engaging wheel 13 is coaxial with the axis of rotation 'A', that is, the point of contact between the wheel 13 and the ground, enables a universal tilt to take place. However, this universal tilt can only take place when the ground engaging half wheels 12 are contiguous with one another as shown in full lines in FIG. 2. FIG. 2 illustrates a transverse shaft 38 along which the half wheels 12 can be moved axially, and also spacers 39 hinged to the hollow frame 11, and positionable over the shaft 38 to either retain the half wheels 12 contiguous with one another so as to constitute a single wheel, or alternatively, to separate the half wheels 12 as shown in dotted lines in FIG. 2, thereby providing a tricycle support for the lawn edger.

Other aspects of the machine, for example, the handle 41, are in accordance with known art.

Whether the cutting blades 17 are of resilient elastomer as shown in FIG. 5 or are of strip spring steel as shown in FIG. 6, they can nevertheless be deflected upwardly by engagement with an unyielding substrate, and their path of rotation will be such in both instances as to effect a "self-sharpening" condition.

The facility of having an either bicycle or tricycle support is of considerable value, since it enables the lawn edger to be used with a much larger range of possible conditions than can be achieved when either one or the other is used alone.

I claim:

1. A lawn edger comprising a hollow frame,
   ground engaging wheels supporting the frame,
   a motor carried by the frame having a rotor with a vertical axis of rotation,
   an axle extending transversely of the frame rearwardly of said axis of rotation, a pair of half-wheels rotatable and slidable on the axle, spacer means co-operable with the half wheels to retain them contiguous with one another in a central longitudinal plane of the frame, or spaced from one another adjacent the lateral sides of the frame,
   fan and cutter assembly within the hollow frame said fan and cutter assembly comprising a plurality of fan blades which extend outwardly from the axis of rotation in generally radial planes, and a plurality of cutting blades beneath the fan blades and which extend axially downwardly and radially outwardly from the axis of rotation,
   one of said ground engaging wheels being rotatably mounted with respect to said frame at a central location with respect to said axis of rotation,
   and means coupling the rotor to the fan and cutter assembly for driving the latter.

2. A lawn edger according to claim 1 wherein each said cutter blade is directly beneath a respective said fan blade, and is sufficiently flexible and resilient that, in use, it is deflectable upwardly against a said fan blade.

3. A lawn edger according to claim 2 wherein each said cutter blade comprises spring steel strip.

4. A lawn edger according to claim 2 wherein each said cutter blade comprises polymeric material.

5. A lawn edger according to claim 1 wherein said hollow frame is partly volute shape, and comprises an upper wall, a lower wall and a side wall, the side and lower walls being discontinuous to provide an inlet opening which extends part way around the periphery of the frame, there also being walls defining an outlet opening.

6. A lawn edger according to claim 5 further comprising a shutter movable across said inlet opening, and securing means between the shutter and the frame for securing the shutter in any one of a plurality of positions across said opening.

7. A lawn edger according to claim 5 or 6 further comprising a suction hood, and securing means releasably securing the suction hood to the frame.

8. A lawn edger according to claim 5 or 6 further comprising a refuse container, and means for releasably supporting said refuse container on the frame in air flow communication with said frame outlet opening.

9. A lawn edger according to claim 1 wherein said hollow frame comprises a lower closure plate which extends across most but not all if its area, said one ground engaging wheel being carried by said lower closure plate.

10. A lawn edger according to claim 1 wherein said spacer means are engageable with the axle and positionable against the axially outer surfaces of the half wheels to retain them contiguous with one another adjacent a central longitudinal plane of the frame,
    or alternatively positionable against the axially inner surfaces of the half wheels to retain them spaced from one another and from that plane.

* * * * *